United States Patent [19]

Di Veto

[11] 3,753,255

[45] Aug. 14, 1973

[54] TRANSDUCING APPARATUS FOR SCANNING DATA RECORDABLE MAGNETIC STRIPES

[75] Inventor: Hilliard R. Di Veto, Plymouth, Mich.

[73] Assignee: Burroughs Corporation, Detroit, Mich.

[22] Filed: Oct. 4, 1971

[21] Appl. No.: 186,203

[52] U.S. Cl. .................... 340/174.1M, 235/61.11D, 235/61.12M, 346/74 MP

[51] Int. Cl.... G06k 7/015, G06k 19/00, G11b 5/48

[58] Field of Search ............ 235/61.12 M, 61.11 D; 179/100.2 A, 100.2 T, 100.2 C, 100.2 CA; 340/174.1 F, 174.1 G, 174.1 H, 174.1 M; 346/74 MP

[56] References Cited

UNITED STATES PATENTS

| | | | |
|---|---|---|---|
| 3,412,483 | 11/1968 | Jacobs | 179/100.2 T |
| 3,527,898 | 9/1970 | Camras | 179/100.2 CA |
| 3,160,704 | 12/1964 | Hollingsworth | 179/100.2 T |
| 2,906,827 | 9/1959 | Gordon et al. | 179/100.2 C |

*Primary Examiner*—Maynard R. Wilbur
*Assistant Examiner*—Thomas J. Sloyan
*Attorney*—Paul W. Fish et al.

[57] ABSTRACT

Relates to magnetic transducing apparatus for reading from and writing upon magnetic stripes secured to the outer surfaces of bank passbooks and the like and includes a traveling magnetic transducing head arranged to engage each magnetic stripe and read from or record data thereon as it is moved therealong. The magnetic stripe serves to store data and is oriented with respect to the path of travel of the transducing head so as to biasedly extend at an acute angle thereto. The transducing head has a lateral extent greater than the width of the magnetic stripe and such that it will overlie the full width of the magnetic stripe throughout its engagement therewith, thus spreading the wear to which the head is subjected as the result of such engagement. The data bearing area of the stripe is preferably spaced from and between the side edges and opposite ends of a patch adhering to the outer surface of a documentary member, such as a bank passbook. The biased relationship of the stripe to the read head will provide a broader engageable surface area to the transducing tip of the head, thereby spreading the wearing area and reducing the amount of material of the tip of the head which is worn away by repetitious engagements with magnetic stripes.

5 Claims, 11 Drawing Figures

INVENTOR.
HILLIARD R. DIVETO
BY Raymond B. Parker
ATTORNEY

TRANSDUCING APPARATUS FOR SCANNING DATA RECORDABLE MAGNETIC STRIPES

BACKGROUND OF THE INVENTION

1. Field of the Invention

The invention relates generally to data recordable magnetic stripes for transducing equipment designed to receive and properly position a transducing read head for scanning the stripe and more particularly to the relative orientation of each of these operating elements with respect to the other.

2. Description of the Prior Art

Identification instrumentalities such as credit cards, bank passbooks and the like are of common knowledge and in widespread use for designating the rightful owner and for protecting his credit and bank accounts. These accounting instruments have been generally issued to customers of financial institutions, such as banks, to provide efficient service and to maintain accurate financial transactions between the customers and the institution. To protect as well as to speed up financial transaction between the customers and the institution, magnetic stripes have been secured to ledger sheets and the like in such a manner that the payee's account is both visible to the eye and is machine readable. Equipment of this kind is capable of sensing the magnetic stripe by transforming magnetic signals into machine readable information, such as the customer's name and account number.

However, with the impressment of magnetic material upon thicker and more deformable material, such as the protection covers of bank passbooks and the like, a problem arises because the recording tip of a magnetic transducing head will have to engage the stripe to assure complete sensing of the recorded data thereon and will wear after repetitive engagements with successive stripes, with the likely result that it will misread the recorded information thereon. For example, as the transducing head contactually moves along the stripe, information normally sensed by the head is converted from stored magnetic bits into electrical signals for handling by data processing equipment. However, the repetitive engagements of the head with the magnetic stripes will develop a worn area which is evidenced by a groove or recess on the recording tip of the head. Moreover, many such repetitious movements of the head over successive magnetic stripes will produce a relatively deep groove in the same area of the head closely approximating the width of the stripe.

Another problem is that the stripe should be fixed in a precise location on such thicker passbook covers so that it aligns exactly with the path of travel of the transducing head. This contributes to the wearing of a relatively deep recess area in the head because in fulfilling these requirements the same portion of the working gap area of the head engages all parts the magnetic stripes which not only effects its usefulness but also its ability to properly contact future magnetic stripes. For example, if the stripe is not in alignment with the worn recess or groove of such a transducing head, the stripe will not fully engagingly seat within the recess and the working gap or tip of the head during the reading of or the writing upon the stripe would be partially if not completely spaced away from the stripe thus adversely affecting the desired transfer of information. If the passbook is properly inserted into the mouth of a transducing apparatus so that the magnetic stripe registers with the worn recess of the head, the read-out may include all that is recorded on the stripe but be otherwise unsatisfactory because of the worn condition of the head. If the magnetic stripe does not register with the worn area of the tip of the head then only the more protruding unworn portions of the tip would engage the stripe with the result that a misreading or a poor recording is very likely to occur. Therefore, if the passbook is not properly positioned within the transducing apparatus and with the stripe in alignment with the worn recess of the head then some if not all of the information recorded on the stripe will be missed.

In view of the difficulties and problems described above, it is evident that an improvement is needed which will overcome these problems and at the same time minimize the unavoidable effect of wear of the transducing heads and thereby extend their lifetime usefulness. It is also apparent that there is need for providing continuous substantially uniform contact between the transducing head and the magnetic stripe regardless of any irregularity in the condition of the cover or the manner of its insertion and positioning in the reading apparatus.

SUMMARY OF THE INVENTION

It is accordingly an important object of the invention to provide an improved method of and apparatus for machine reading of relatively thick, deformable materials and more specifically the covers of books such as bank passbooks and the like.

Another important object of the invention is to provide an improved magnetic stripe patch for securement to relatively thick, deformable articles and in such a manner as to reduce the wear on a transducing head engageable with the stripe as it is moved therealong.

It is another important object of the invention to provide an accurate, reliable and durable method of transducing information from a magnetic stripe subject to rubbing action of the transducing head as it moves along the stripe which reduces the wear of the head while assuring strong transduced signals even as the wear occurs.

Another important object of the invention is to provide improved apparatus for machine reading of magnetic stripes.

A further important object of the invention is to provide improved apparatus for machine reading of magnetic stripes secured to relatively thick support members, such as the covers of bank passbooks and the like, and which assures that the reading head of the apparatus applies a continuous substantially uniform rubbing action on the magnetic stripe as relative movement occurs between the head and the magnetic stripe.

A still further object of the invention is to provide a novel process for economically fabricating magnetic stripe patches incorporating features of the invention.

In carrying out the objects of this invention, the present invention contemplates a novel method of and apparatus for sensing magnetic impulses recorded on a magnetic stripe and secured to a relatively thick, yielding documentary medium which requires actual engagement of the read head with the stripe as relative movement occurs between the head and stripe. Typical of such documental media are the relatively soft compressible covers of books and the like and particularly the protective covers of bank passbooks. The present invention reduces the resulting detrimental erosion resulting from the engagement of the head with the magnetic material on the stripe by establishing a particular dimensional relation between the magnetic stripe and the read head and by a distinctive orientation of the magnetic stripe to the path of travel relatively occurring between the read head and the magnetic stripe for producing the signals in the head. More specifically, as illustrated herein, the magnetic stripe is secured to the cover of a bank passbook or other similar financial bookkeeping instrument, so that its longitudinal axis extends, when read by the transducing read head, at an angle to the path of travel of the latter. By this provision the eroding effect of the magnetic material of the stripe on the engaging end of the read head is spread over a wider area of the head thus reducing its depth as well as widening the recess it forms in the head.

To provide the desired orientation of the magnetic stripe to the path of travel of the read head, the transducing apparatus of which the head is a part is provided with an abutting wall or edge guide with which one edge of the cover of the book bearing the stripe is brought up against. The read head is mounted for travel in the illustrating embodiment of the invention at a predetermined angle with respect to this guide edge. In this illustrated embodiment the guide extends parallel to the path of travel and the stripe is secured to the book cover at such an angle to its leading edge that when the cover is inserted into the transducing apparatus the longitudinal axis of the stripe extends at an acute angle or bias to the path of travel of the head. A feature of the transducing apparatus is the provision which yieldingly forces the read head into engagement with the magnetic stripe and maintains such pressure on the head during its travel over the stripe. Another feature of the invention concerns the dimensional relation of the stripe and the read head, the latter having a wider extent than the stripe sufficient to overlie or straddle the latter throughout its engaging stroke even though the stripe is inclined to the path of travel of the head. A further feature of the invention relates to an economical method of producing a multi-layer strip bearing the magnetizable material and for severing the magnetic stripes from the strip as individual patches for securement to book covers and the like.

These and other objects, advantages and aspects of the present invention will be more clearly understood from the following description of the drawings, specification and appended claims, wherein:

DESCRIPTION OF A PREFERRED EMBODIMENT

Figures 1, 2:
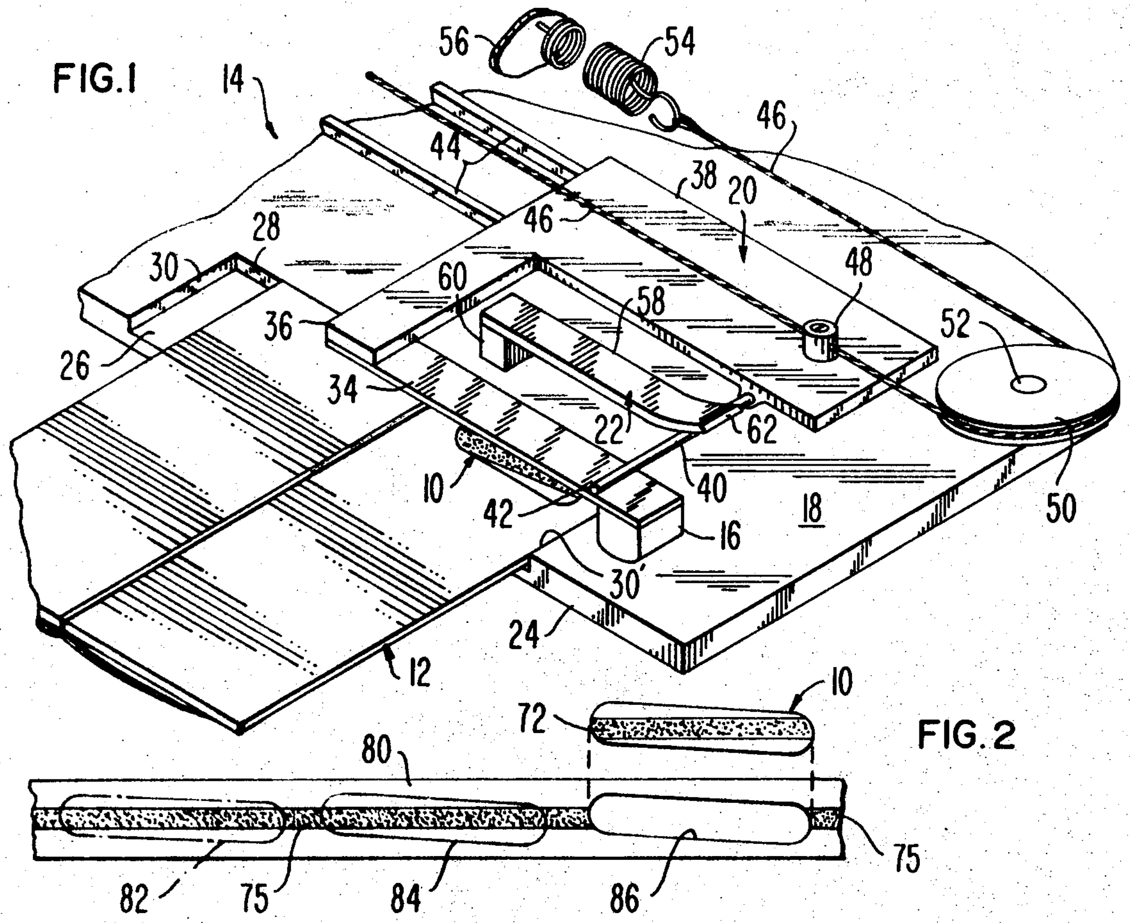
FIG. 1 is a partial perspective view of the read station of a record processing apparatus showing the reception therein of a passbook bearing a magnetic data recording stripe patch embodying features of the invention.
FIG. 2 is a plan view illustrating a portion of a tape and showing successive steps in the manufacture of magnetic stripe patches.
Figure 3:
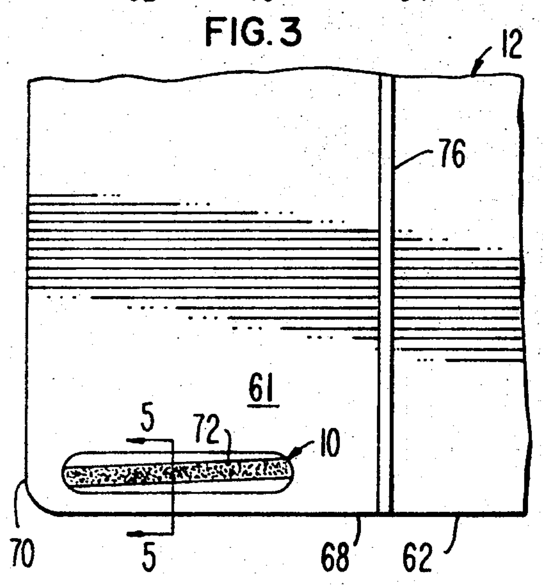
FIG. 3 is a partial view of a vertical seam passbook illustrating a corner location of a magnetic stripe patch extending perpendicular to the seam fold.
Figure 4:
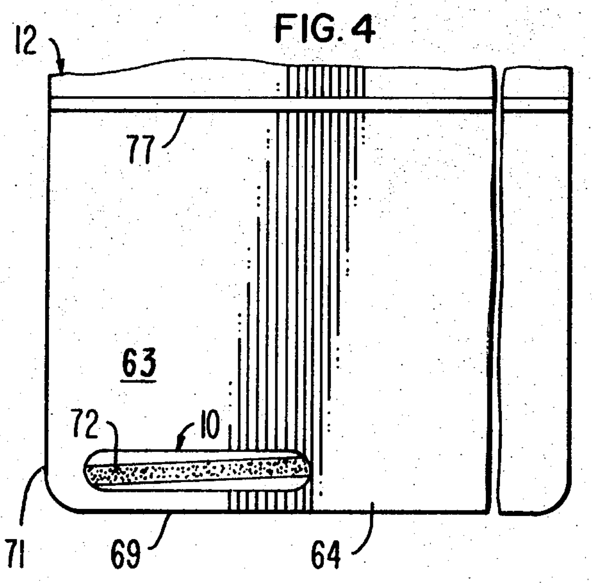
FIG. 4 is a partial view of a horizontal seam passbook illustrating another corner location of the magnetic stripe patch extending parallel to the seam fold.

Referring to the drawings wherein like reference characters designate similar or identical elements in the Figures, and with particular reference to FIGS. 1, 3 and 4, there is shown, generally, a magnetic stripe label or patch 10 which as shown in FIG. 1 is usable in combination with record media, such as a bank passbook 12, and a read station generally indicated at 14. The read station 14 is constructed so as to be able to accept covers of passbooks of various sizes and thicknesses as well as of different styles as those with horizontal and vertical fold seams. To compensate for their different thicknesses a read head 16 of the read station 14 is resiliently mounted so that it will be in continuous contact with the magnetic stripe patch 10 as the head moves along its path of travel. In the description which follows, it will be noted that the patch 10 is secured or bonded to the passbook 12 such that when the book is properly placed into a readable position with respect to the read head 16, the magnetic stripe carried by the patch will be angularly displaced relative to the path of travel of the read head to provide uniform contact therewith and to reduce excessive wear of the transducing tip area of the read head 16.

As shown in FIG. 1, the transducing station 14 may comprise, in general, a support or base plate 18, a transducing head carriage 20 and a camming device 22. The base plate 18 along its forward edge 24 is reduced in thickness to form an entry or mouth 26 extending partly thereinto and includes an inner or abutting wall 28 and opposed side walls 30—30. The inside dimensions of the mouth 26 are large enough to accommodate bank passbooks 12 of various sizes and styles which are in common use today, such as the examples shown in FIGS. 3 and 4. Thus, when a passbook 12 is fully inserted into the entry 26, in the manner shown in FIG. 1, it will be positioned to locate the patch 10 and particularly its magnetic stripe in an engageable and readable relationship with the head 16.

The read head 16 is shown in FIG. 1 as secured to one end of a resilient arm 34, the other end being secured to a rigid support member 36 which extends at a right angle from one end of the plate 38 of the transducing head carriage 20. The support member 36 carries the arm 34 in spaced parallel relationship to the carriage plate 38 so that the arm 34 will overlay the patch 10. A rod or shaft 40, serving as an actuator, is rigidly connected to end of the carriage plate 38 opposite the support member 36 and extends across the space to the arm 34 so that its free end 42 lies above the upper surface of the arm 34. The resilient arm 34 is employed in order that the transducing station 14 may accommodate various thicknesses of passbooks. The carriage 20 is guided for to and fro straight line motion by any suitable means, such as a pair of tracks 44 secured to the upper surface of the base plate 18, the tracks being spaced parallel with the abutting guide wall 28 of the access opening 26 for the passbook, the length of the tracks 44 being sufficient to allow the carriage 34 to move the read head 16 from its home position (shown in FIG. 1) to slightly past the other end of the patch 10.

This is accomplished in the present instance by fixing the carriage 20 to a portion of a flexible cable 46 in the manner indicated at 48. The cable 46 extends the length of the tracks 44 wherein one end of the cable 46 is wound about a rotatable or winding drum (not shown). Adjacent to the home position of the carriage 20, the cable 46 is wound around a pulley 50 journaled to a stud shaft 52 which projects from the upper surface of the plate 18. The other end of the cable is attached to a return spring 54 which is secured to a stationary structure 56 of the transducing apparatus, as shown in FIG. 1. Therefore, the cooperation between the winding means and the return spring 54 will provide the to and fro motion of the read head 16 over the magnetic stripe patch 10 for producing electrical signals corresponding to the data read from the magnetic strip on the patch 10.

The camming device 22 depicted in FIG. 1 includes a cam arm 58 disposed between and parallel to the path of travel of the carriage 20 and arm 34. One end of the arm 58 is fixed to a stationary support member 60 which in turn is fixed to the upper surface of the base plate 18, as shown in FIG. 1. The other end 62 of the cam 58 is curved slightly upwardly to provide an abuttable flared entrance to a camming surface for biasing the rod 40 downwardly when the carriage 38 moves away from its normal starting position. The cam arm 58 is supported at a distance above the upper surface of the plate 18 so as to cause the rod 40 to apply downward pressures on the arm 34 with the result that the recording tip of the read head 16 is brought into engagement with the magnetic data bearing area of the patch 10 and continuous such engagement as the carriage 38 moves away from its starting position.

As previously mentioned herein the magnetic stripe patch 10 may be fixed to the faces or covers of bank passbooks 12. FIGS. 3 and 4 illustrate two different sizes and types of passbooks 61 and 63, the former known as a vertical seam type and the latter as a horizontal seam type. Passbooks, such as the one's shown, come in different thicknesses. As shown in the FIG. 3, the patch 10 is located in the lower left-hand corner of the passbook 61 and may be fixed thereto by pressure sensitive adhesive. The patch 10 is located adjacent and parallel to the leading edge 68 of the passbook. The left-hand edge 70 of the passbook 12 may serve as a guide for endwise positioning of the patch relative to the starting position of the carriage 20 and its read head when the passbook is inserted into the recessed pocket 26 formed in the base plate as shown in FIG. 1. That is to say, when the passbook 12 is inserted into the aperture 26 the leading edge 68 and the left-hand edge 70 will be brought up against the pocket walls 28 and 30' respectively to position the magnetic stripe of the patch 10 in the desired predetermined angular relationship with respect to the path of travel of the read head 16. As shown in FIG. 4, the patch 10 is similarly positioned adjacent and parallel to the leading edge 69 of the passbook 63 but also extends parallel to the fold seam 77. In either type of passbook the location of the patch with reference to the leading edges 68 and 69 and side edges 70 and 71 is the same.

Previous references have been made herein to the magnetic stripe carried on one side of the patch or label 10, the latter having its other side adhesively secured to the passbook. A stripe of this character is more specifically illustrated in the remaining Figures and is identified by reference character 72.

Figure 6:
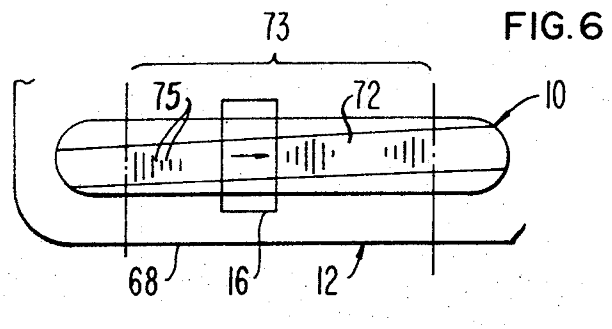
FIG. 6 is a diagrammatical enlarged plan view of the magnetic stripe shown adhered to a corner portion of a passbook with a read head superimposed thereon.
Figure 8:
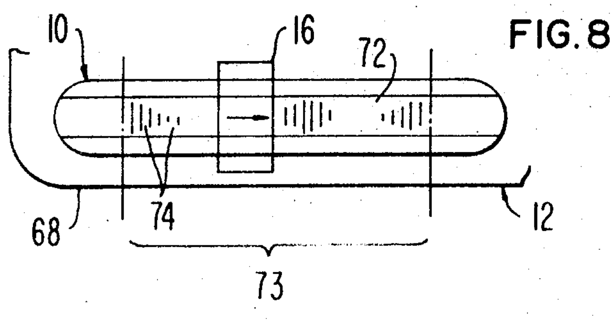
FIG. 8 is a diagrammatical enlarged plan view of the magnetic stripe adhered to a corner portion of a passbook also having a read head superimposed and illustrating a prior art attempt wherein the magnetic stripe extends parallel to the longitudinal axis of the patch and also parallel to the adjacent edge of the passbook.

As illustrated in FIGS. 6 and 8, the recorded data on the magnetic stripe 72 usually takes the form of incremental areas or bits 75 which as well known in the prior art are normally disposed in perpendicular relation to the longitudinal dimensions of the stripe. However, since the magnetic stripe 72 is inclined to the direction of travel of the read head 16 it is preferred for better sensing to dispose these bits perpendicular to the path of travel of the head and thus at the same angle to the axis of the stripe as that which the stripe bears to the direction of travel of the head. In other words, as shown in FIG. 6 representing the practice of the invention, the recorded bits 75 extend perpendicularly crosswise to the direction of movement of the head and regardless of the biased position of the magnetic stripe 72 on the patch. The magnetic stripe 72 is usually a ferric oxide coating carried on a supporting substrate as later described herein. The data bearing section of the magnetic stripe 72 is preferably less than its length, as is indicated by the two phantom lines 73 in FIGS. 6 and 8.

Figure 5:
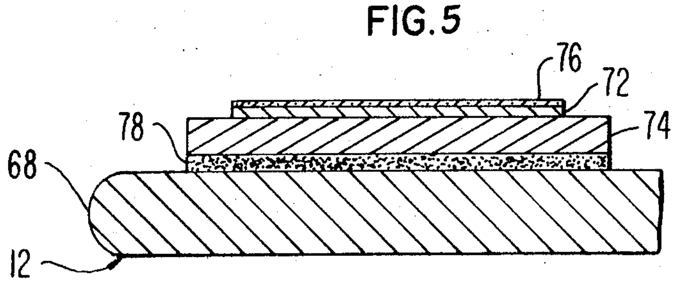
FIG. 5 is a considerably exaggerated cross-sectional view taken along line 5—5 of FIG. 3 showing the different layers which comprise a magnetic stripe patch.

In the illustrated embodiment of the invention, the patch 10 is a laminated structure composed of several layers, and with reference to FIG. 5 these layers are shown in much exaggerated condition and preferably comprise a thicker base layer 74 of approximately 0.0030 inch thick, the magnetic stripe layer 72 of approximately 0.00040 inch thick, an outer protective film 76 of approximately 0.000020 inch thick, and a pressure responsive adhesive coating 78 of approximately 0.0010 inch thick. This adhesive layer is initially protected by a peelable release liner over its exposed surface but which is not shown because it is removed prior to the adhesive securement of the patch to the book cover 12.

A preferred method of fabricating the magnetizable strip bearing patches is illustrated in FIG. 2. The relatively thick base layer or substrate 74 is formed as an elongated tape 80 of constant width. The narrower band of magnetic material which is ultimately to form the stripe 72 is laid down on the tape 80 centrally between the side edges thereof as shown at 75 in FIG. 2. This may be accomplished by painting the magnetic material on the tape. The remaining layers of the patches to be formed may be applied to the exposed surfaces of the tape 80 and painted stripe 75. Thereafter, the tape assembly is passed through a cutting station including one or more cutting implements each shaped with the outline of the patch, the cutting implements however being slightly inclined to the longitudinal axis of the tape as shown in FIG. 2. The several steps of fabricating the patches from the tape are sequentially illustrated in FIG. 2 from left to right. The outline of one cutting device is shown at 82 at the left end of the tape. The full line image 84 in the middle of the tape illustrates its condition immediately following a cutting operation at which time the patch is severed from the material of the tape but still lies in the plane thereof. The right end of the tape in FIG. 2 illustrates the lift off or removal of the severed patch 10 from the tape leaving an aperture 86 in the tape 80 of the same shape and angular disposition as that previously occupied by the patch.

Figure 7:
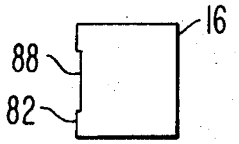
FIG. 7 is an end view of the read head projected from FIG. 6 illustrating in exaggerated condition a worn recess formed therein.
Figure 9:
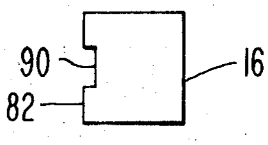
FIG. 9 is an end view of the read head projected from FIG. 8 further illustrating in exaggerated condition a worn recess formed therein.

In addition to the above information one must appreciate that with repetitive engagement of the head 16 with the stripe 72, the transducing head 16 will develop a worn area represented by the recesses 88 and 90 illustrated respectively in FIGS. 7 and 9. Each such Figure is a projected end view of the read head 16 showing an exaggerated depth of each of the recess formed in the recording tip 82 of the head 16 resulting from the wearing engagement of the head with the magnetic stripe. FIG. 9 illustrates the condition of the head when the stripe 72 extends parallel to the path of travel of the head. It will be noted in FIG. 9 that the width of the recess 90 coincides with that of the stripe and is of considerable depth. FIG. 7 illustrates the worn condition of the head when the magnetic stripe 72 extends at a bias in accordance with this invention. The recess 88 is shallower and wider. It is evident in FIG. 9 that considerable greater wear will occur if the stripe 72 aligns with the path of travel of the transducing head as shown by the arrow in the corresponding view of FIG. 8. However, as shown in FIG. 7, the inclination of the stripe 72 in accordance with this invention spreads the worn area and reduces its depth. The biasing of the magnetic stripe contributes to a longer life for the head 16 and provides additional advantages as hereinafter described.

Figure 10:
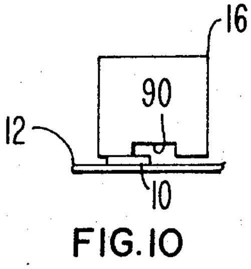
FIG. 10 is a diagrammatical view illustrating the offset relation of the magnetic stripe to the deeper and narrower recess worn in the read head by having the stripe extend parallel to the path of travel of the head.
Figure 11:
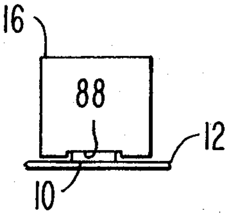
FIG. 11 is an exaggerated diagrammatical view illustrating the shallower but wider worn recess in the tip of the head in accordance with this invention and showing the patch fully received in the recess.

FIGS. 10 and 11 are diagrammatical views respectively illustrating and distinguishing between a conventional way of proceeding and the present invention, and what happens when the patch is not aligned correctly on the passbook 12. In other words, the patch 10 of invention (shown in FIG. 11) need not be positioned exactly in the same position or alignment relative to the path of travel of the recess 88 of the head 16 to have uniform contact therewith and derive satisfactory signals therefrom. Therefore, the position of the patch 10 can be approximate in its relation to the leading edge 68 of the cover 60 of the passbook 12 as shown in FIGS. 3 and 6 and 11. However, if the expected normal conventional procedure is adopted, the patch 10 must be positioned (as shown in FIG. 8) in exact distance from the leading edge 68. For example, if the patch 10 is not positioned properly or exactly on the face 60 of the passbook a skewing effect results wherein only a portion of the recording tip will engage the stripe 72 whereby only a partial reading can occur, as shown in FIG. 10. FIG. 11 on the other hand is an illustration of the present invention wherein there is full engagement between the stripe 72 and the recording tip of the head 16 even though the patch 10 is an approximate position on the passbook 12.

Operation

The operation of the passbook reader described is believed to be readily understood from the previous description herein. However, it may be helpful to reiterate the operational procedure in general, having in mind the advantages given in the servicing of passbooks and the like as well as to consider certain modifications that may be made.

The operation of the passbook reader will be described under normal operating conditions, that is, when the passbook 12 is used in connection with a read station 14, as shown in FIG. 1. When the passbook 12 is inserted by an operator into the pocket formed by the recessed area 26 of the read station, the operator should place the side edge 70 of the passbook against the one or the other end walls 30, 30' and preferably against the latter until its leading edge 68 firmly abuts the wall 28. This guiding and abutting action will bring the left-hand corner of the passbook square within the pocket to position the patch 10 at the home or starting position of the head 16. Therefore, once the passbook's lateral position is obtained relative to a read head 16 a signal will automatically be transmitted within the reading apparatus to energize the cable winding means in the read station 14.

The winding means (not shown) then will begin to take-up the cable 46 so that the carriage 38 and its head 16 will commence to move from its home position along the tracks 44 in a direction from right to left as viewed in FIG. 1. Almost instantly the shaft 40 will cooperate with the camming surface of the cam arm 58 to lower the read head 16 into engagement with the stripe 72. As the carriage continues to travel, the shaft 40 will be forced against the resilient arm 34 by the camming surface of the cam arm 58 so as to have the transducing tip of the read head 16 in engagement with the stripe patch 10 throughout its travel and convert the data stored in the data bearing area of the strip 72 into electrical signals usable byother data processing equipment. As previously mentioned, the cooperation between the cam arm 58, shaft 40 and resilient by depressible arm 34 is provided so that varying thicknesses of book covers and similar documentary media may be accommodated and machine read without difficulty.

While a particular embodiment of the invention has been shown and described, it will be understood, that it is not desired that the invention be limited thereto since modifications may be made, and it is therefore contemplated by the appended claims to cover any such modifications as fall within the true spirit and scope of the invention.

What is claimed is:

1. An apparatus having a magnetic transducing head member and further having an abuttable edge for serving as a positioning guide, a documentary member having an edge engageable with said abuttable edge and being positioned thereby in overlapping relation to the head member, an uninterrupted stripe of magnetizable material bonded to said documentary member and adapted to bear magnetically stored information means for causing movement of the head member, and the documentary member relative to one another and such that the path of travel of the movable member is generally coincident with the magnetic stripe, means for pressing the head member into engagement with said magnetic stripe and while such relative movement of the members occurs, and the dimensional relation of the transducing head member and the magnetic stripe being such that the head member has a lateral extent greater than the width of the magnetic stripe and that said magnetic stripe is inclined to said path of travel so as to spread the wear to which the head member is subjected as a result of such engagement beyond the width of the magnetic stripe.

2. The apparatus according to claim 1 wherein the means providing said relative movement holds the documentary member stationary while moving the transducing head member along said path of travel.

3. The apparatus according to claim 2 wherein the lateral extent of the transducing end of the head member is such that throughout that part of said path of travel when the head member is pressed into engagement with the inclined magnetic stripe its transducing end bears against the full width of the magnetic stripe.

4. A magnetic stripe as defined in claim 3 wherein the information bearing area of the magnetic stripe is less than the length thereof and wherein the information stored on the magnetic stripe is in the form of a plurality of incremental bits elongated in one dimension and having such dimension extending perpendicular to the path of travel of the head member and inclined to the longitudinal axis of the stripe.

5. The apparatus according to claim 1 wherein the magnetic stripe is carried on the exposed face of a substrate having its opposite face bonded to the documentary member.

* * * * *